United States Patent Office 3,848,032
Patented Nov. 12, 1974

3,848,032
PROCESS FOR PREPARING PHOSPHORUS-CONTAINING ACIDS
William Monroe Le Suer, Cleveland, and Horton Dunn, Jr., Euclid, Ohio, assignors to The Lubrizol Corporation, Wickliffe, Ohio
No Drawing. Filed Dec. 8, 1972, Ser. No. 313,306
Int. Cl. C07f 9/08
U.S. Cl. 260—981
9 Claims

ABSTRACT OF THE DISCLOSURE

An improved process for preparing phosphorodithioic acids wherein the hydroxy containing compounds are reacted with phosphorus pentasulfide, the improvement therein comprising carrying out the reaction in the presence of a catalytically effective amount of a nitrogen-containing compound characterized by the presence within its structure of at least one grouping of the formula

These nitrogen-containing compounds permit the process to be carried out at lower reaction temperatures and/or for shorter reaction periods, provided impoved utilization of reactants, improved yields, and result in the preparation of phosphorodithioic acids characterized by lighter colors.

---

This invention relates to an improved process for preparing phosphorodithioic acids. More particularly, this invention is concerned with an improved process for preparing phosphorodithioic acids by reacting hydroxy compounds with phosphorus pentasulfide, said improvement comprising carrying out this reaction in the presence of a catalytically effective amount of at least one nitrogen-containing compound characterized by the presence within its structure of the group

where X is oxygen or divalent sulfur.
Phosphorodithioic acids of the formula

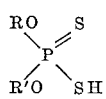

wherein R and R' are each independently selected from hydrocarbyl and substituted hydrocarbyl groups are well know in the art as are the methods for their preparation. Generally speaking, the phosphorodithioic acids are prepared by reacting hydroxy compounds of the formula ROH, R'OH, or mixtures thereof, with phosphorus pentasulfide ($P_2S_5$) in a ratio of about 4 equivalents of hydroxy compound per mole of phosphorus pentasulfide. It is not uncommon to use a stoichiometric excess of hydroxy compound in the process. Stoichiometric excesses of up to about 10% are not unusual but greater or lesser excesses may be employed.

Literature references often refer to $P_4S_{10}$ as the chemically correct formula for phosphorus pentasulfide. If phosphorus pentasulfide is regarded as having the latter composition, then the stoichiometric ratio of equivalents of hydroxy compound to phosphorus pentasulfide in the preparation of phosphorodithioic acids is about eight equivalents to one mole of phosphorus pentasulfide. U.S. patents usually refer to phosphorus pentasulfide as having the formula $P_2S_5$ and describe the preparation of the phosphorodithioic acids as involving the reaction of four equivalents of the hydroxy compound with one mole of $P_2S_5$. This patent approach to describing the reaction is utilized hereinafter with the understanding that it is regarded as the equivalent of the reaction of eight equivalents of the hydroxy compound with one more of $P_4S_{10}$.

In order to establish that the basic reaction is well known to those skilled in the art and that the general parameters thereof such as reaction temperature, reaction ratios, diluents, suitable hydroxy compounds, recovery procedures, and the like are likewise known in the art, applicants make of record and incorporate by reference the following U.S. patents: 2,480,673; 2,552,570; 2,618,597; 2,734,864; 2,734,865; 2,977,382; 3,000,822; 3,058,910; 3,070,546; 3,073,781; 3,029,268; 3,081,261; 3,151,075; 3,361,668; 3,185,728; 3,197,496; 3,210,275; 3,293,181; 3,442,804. U.S. Pat. 3,361,668 discloses the use of certain amines in the preparation of phosporolithioic acids to obtain lighter colored products.

As is discussed in these patents, the hydroxy compounds from which the phosphorodithioic acids are derived can be represented generically by the formulae ROH or R'OH wherein R and R' are hydrocarbyl and substituted hydrocarbyl groups. Furthermore, mixtures of these hydroxy compounds can be used, that is, mixtures comprising one or more compounds of the formula ROH, or one or more compounds of the formula R'OH, or mixtures of ROH and R'OH can be used. As is recognized in the art, these hydroxy compounds need not be monohydroxy compounds. That is, phosphorodithioic acids can be prepared from mono-, di-, tri-, tetra- and other polyhydroxy compounds. Accordingly, it is to be understood that while, for the sake of simplicity, applicants have used structural formulae to represent hydroxy compounds which are monohydroxy compounds and phosphorodithioic acids prepared from such monohydroxy compounds, this invention is completely applicable to the preparation of phosphorodithioic acids from polyhydroxy compounds as well as monohydroxy compounds or mixtures of these. Likewise, the improvement recited in the claims appended hereto is to be understood as encompassing improvements in the process for preparing phosphorodithioic acids derived from polyhydroxy compounds, mixtures of polyhydroxy compounds, or mixtures of polyhydroxy compounds and monohydroxy compounds.

Examples of general classes of compounds corresponding to the formula ROH and R'OH are those wherein R and R' are alkyl, cycloalkyl, alkyl-substituted cycloalkyl, aryl, alkaryl, arylalkyl, alkoxyalkyl, alkoxyaryl, haloalkyl, haloaryl, nitroaryl, and the like. Specific examples of such hydroxy compounds are phenol, resorcinol, hydroquinone, catechol, cresol, xylenol, hydroxydiphenyl, benzylphenol, phenylethylpehnol, methylhydroxydiphenyl, guiacol, alpha- and beta-naphthol, alpha- and beta-methylnaphthol, tolylnaphthol, benzylnapthol, anthranol, phenylmethylnaphthol, phenanthrol, monomethyl ether of catechol, anisole, chlorophenol, octyl alcohol, cyclohexanol, 2-ethylhexanol, isopropanol, methylcyclohexanol, cycloheptanol, cyclpentanol, 2,4-diamylphenoxypehnol, butanol, isoamyl alcohol, oleyl alcohol, dodecanol, lauryl alcohol, cetyl alcohol, ethylene glycol, propylene glycol, octylphenoxyethanol, methanol, ethyl alcohol, neopentyl alcohol, isohexyl alcohol, 2,3-dimethyl-butanol-1, n-heptanol, diisopropyl carbinol, glycerol, diethylene glycol, capryl alcohol, nonylphenol, decylphenol, polyisobutyl (molecular weight 1000-substituted phenol), and the like. Such hydroxy compounds are well known and other suitable hydroxy compounds useful in the preparation of phosphorodithioic acids will be readily apparent by those skilled in the art.

Generally speaking, the number of carbon atoms in each of R and R' will be within the range of about one to one hundred and fifty and usually within the range of about two to about forty. A preferred group of hydroxy compounds from which the phosphorodithioic acids are prepared will be those wherein R and R' are alkyl of two to forty carbon atoms. An especially preferred group of hydroxy compounds are those wherein R and R' are aryl or substituted aryl of up to one hundred and fifty carbon atoms, especially phenyl, and alkylated phenyl wherein the phenyl group may contain one to three alkyl substituents of one to forty carbon atoms. The improved process of the present invention is particularly useful in preparing phosphorodithioic acid wherein at least one of R and R' is derived from a hydroxy compound where R and R' is such an aryl or substituted aryl group.

As one of the primary uses for phosphorodithioic acids is in the preparation of neutral and basic metal salts which can be used as additives in lubricants and fuels, it is often advantageous to select hydroxy compounds such that the total number of carbon atoms in R and R' in the phosphorodithioic acid will be at least about six and generally at least about eight in order to provide solubility in the oils and fuels in which they are to be used. However, phosphorodithioic acids have other uses such as intermediates in the preparation of pesticides, fungicides, insecticides, bacteriacides, herbicides, and the like wherein oil- and fuel-solubility is not a necessary characteristic. Accordingly, it is to be understood that the improvement recited herein is applicable to the preparation of phosphorodithioic acids which are not oil-or fuel-soluble.

As mentioned above, a preferred aspect of this invention involves applying the improvement to the preparation of phosphorodithioic acids wherein at least one of the hydroxy compounds to be reacted with the phosphorus sulfide is a hydroxy aromatic compound such as phenol, naphthol, substituted phenols, e.g., alkylated phenols, and the like. The improved process of this invention has been found to be particularly useful in preparing phosphorodithioic acids derived from such hydroxy aromatic compounds in that it permits lower reaction temperatures and/or reduced reaction periods and results in the preparation of lighter colored phosphorodithioic acids, this latter advantage being desirable in the preparation of lighter colored metal salt derivatives to be used in lubricants and fuels.

The improvement of the invention resides in the use of certain nitrogen-containing compounds as catalysts in the preparation of phosphorodithioic acids. These nitrogen-containing compounds are characterized by the presence within their structure of at least one group of the formula

wherein X is oxygen or divalent sulfur. The language "catalytically effective amount" as used with respect to these nitrogen-containing compounds is meant to describe that amount which will provide the desired results in a given reaction for preparing a phosphorodithioic acid. Since, as mentioned above, there are several advantages associated with the use of these catalysts, that amount of catalyst which will provide one of these advantages may not be sufficient to provide another. However, it has been found that usually at least about 0.05% and up to about 10% by weight of the nitrogen-containing compound should be used based on the total weight of P₂S₅ employed in the reaction. Usually the catalytic amount will fall within the range of 0.1% to about 7% by weight of the total weight of P₂S₅ employed and a range of about 0.25% to about 5% by weight seems to be the optimum amount of nitrogen-containing compound to achieve the desired advantages in most situations.

The nitrogen-containing compounds will generally be selected from the class consisting of

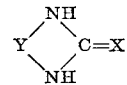

Formula A where X is oxygen or divalent sulfur, Y is a divalent organic radical of up to ten carbon atoms which, with the

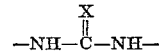

group forms a 5-, 6- or 7-membered ring and

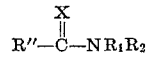

Formula B wherein X is oxygen or divalent sulfur, R" is H, NH₂—, alkyl of up to twenty carbon atoms, hydrocarbon aryl groups of up to twenty carbon atoms, and each of R₁ and R₂ are independently H, lower alkyl, or lower alkenyl with the proviso that one of R₁ and R₂ together with R" and the

group can form a 5-, 6-, or 7-membered lactam ring; that is, a ring structure characterized by the presence of the group

as part of the ring, e.g.,

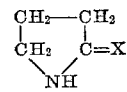

Usually, the variable Y of Formula A will be an alkylene group of two to seven carbon atoms wherein the number of carbon atoms in the alkylene group forming part of the ring structure will be two or three. Typical examples of such compounds are ethylene thiourea, ethylene urea, and the like. Illustrative compounds corresponding to the formula

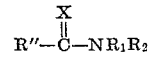

wherein R", X, R₁ and R₂ are as defined above are N-vinyl pyrrolidone, pyrrolidone, caprolactam, urea, thiourea, acetamide, benzamide, N,N-dimethylformamide, oleamide, linoleamide, or mixtures of two or more of these compounds. The 5-, 6!, and 7-membered lactams are preferred catalysts with caprolactam being especially preferred.

The following examples set forth preferred embodiments of the present invention and further illustrate the improved process described and claimed herein. Unless otherwise indicated, all percentages and parts in the examples and elsewhere in the specification and claims are intended to refer to percent by weight and parts by weight.

EXAMPLE 1

(A) To a three-necked round bottom flask fitted with an agitator, thermometer, and reflux condenser there is added 94 parts phenol which is heated to 50° C. Thereafter, 56 parts of P₂S₅ is added and the resultant mixture maintained at a temperature of 60°–65° C. During 4.5 hours. During the first hour of heating, no H₂S appears to evolve but subsequently there is a slow evolution of H₂S. The reaction mixture is then filtered. The unreacted P₂S₅ is washed with benzene and then petroleum ether and subsequently dried. A total of 45 parts of unreacted P₂S₅ is recovered indicating little formation of the desired diphenyl phosphorodithioic acid. The reaction product is found to contain 2.48% phosphorus compared to a theoretical phosphorus content of 10.99 and 4.15% sulfur compared to a theoretical sulfur content of 22.69.

(B) The procedure of part (A) is repeated except that 9 parts of water is added to the mixture before the phenol and $P_2S_5$ are heated at a temperature within the range of 50°–65° C. for five hours. Again, 45 parts of unreacted $P_2S_5$ is recovered indicating little formation of the desired phosphorodithioic acid. The reaction product is characterized by a phosphorus content of 3.04% relative to a theoretical phosphorus content of 10.99 and a 2.34% sulfur content relative to a theoretical sulfur content of 22.69.

(C) The procedure of (A) above is repeated except that after addition of the $P_2S_5$, there is added 3 parts by weight of N - vinyl - 2 - pyrrolidone. An exothermic reaction ensues in which the temperature of the reaction mass rises to 56° C. Thereafter the material is held for 4.5 hours at 60°–65° C. at which time $H_2S$ evolution ceases. The reaction mixture at this point is characterized by a neutralization number (phenolphthalein) of 202 (acid) compared to a theoretical neutralization number of 199 (acid). The reaction mixture is then heated to 100° C. during which time the mixture still remains light-colored and thereafter is filtered. The product is characterized by a phosphorus content of 10.6% relative to a theoretical phosphorus content of 10.99% and a sulfur content of 20.90 relative to a theoretical sulfur content of 22.69%.

(D) The general procedure of (C) is repeated except that the amount of N-vinyl-2-pyrrolidone is reduced from 3 parts to 1 part. The reaction mixture is maintained at 55°–60° C. for 5.5 hours at the conclusion of which all the $P_2S_5$ has reacted and the reaction mixture filtered. The product is characterized bzy a phosphorus content of 11% compared to a theoretical phosphorus content of 10.99% and a sulfur content of 21.07% relative to a theoretical sulfur content of 22.69%.

Following the general procedure act forth hereinabove in Example 1, phosphorodithioic acids were prepared using the indicated weight ratios of hydroxy compounds, $P_2S_5$, and the nitrogen-containing catalyst shown in the following table.

EXAMPLE 14

(A) In this example, a di(dodecyl-substituted phenyl)-phosphorodithioic acid is prepared using N-vinyl-2-pyrrolidone as a catalyst. The catalyst permits production of the acid in high yields by heating the substituted phenol and $P_2S_5$ for four and one-half hours over a temperature range of 28° C. to 110° C. whereas, normally, to obtain similar yields, reaction temperatures of 140° C. to 155° C. are necessary. 528 parts of isodecylphenol, 111 parts of $P_2S_5$, and 12.4 parts of N-vinyl-2-pyrrolidone are mixed in a reaction flask. The reaction mixture is then heated from 28° C. to 110° C. over a four and one-half hour period and filtered. The desired product is a filtrate and is characterized by a phosphorus content of 4.73% theory: 4.98) and a sulfur content of 9.61% (theory: 10.29).

(B) The above procedure is repeated without the caprolactam. The dodecylphenol and $P_2S_5$ are heated to a temperature of from 20° C. to 95° C. for a 2.25 hour period 106 grams of dried unreacted $P_2S_5$ are recovered indicating almost no reaction within this temperature range to the absence of the nitrogen-containing catalyst.

EXAMPLE 15

A reaction mixture comprising 528 parts of isodecylphenol, 111 parts of $P_2S_5$, and 12.4 parts of caprolactam is heated from about 22° C. to 100° C. over a two-hour period and filtered. The filtrate is the desired phosphorodithioic acid and is characterized by a phosphorus content of 4.69% (theory: 4.98) and a sulfur content of 9.8% (theory: 10.29). From this, it is apparent that the lactam permits even lower temperatures and short reaction periods than the N-vinyl-2-pyrrolidone used in Example 14.

EXAMPLE 16

A reaction mixture comprising 408 parts of methylamyl alcohol, 222 parts of $P_2S_5$ and 3 parts of caprolactam are heated to a temperature of 40°–90° C. for about three hours. The $P_2S_5$ is added incrementally during this period of time. The reaction mixture is then filtered at 55° C. producing 568 parts of filtrate which is the desired phosphorodithioic acid. It is characterized by a phosphorus content

TABLE

| Example No. | Hydroxy compound (parts by wt.) | Parts by wt., $P_2S_5$ | Catalyst, (parts by wt.) | Reaction time, hrs. | Reaction temp., °C. | Percent by wt. P | | Percent by wt. S. | |
|---|---|---|---|---|---|---|---|---|---|
| | | | | | | Found | Theory | Found | Theory |
| 2 | Phenol (94) | 56 | Caprolactam (3) | 2 | 55–65 | 10.8 | 10.99 | 21.40 | 22.69 |
| 3 | do | 56 | Urea (3) | 3.5 | 55–65 75 | 10.9 | 10.99 | 20.85 | 22.69 |
| 4 | do | 56 | Acetamide (3) | 4 | 55–65 | 10.8 | 10.99 | 21.61 | 22.69 |
| 5 | do | 56 | 2-Pyrrolidone (3) | 4 | 55–65 | 10.7 | 10.99 | 22.42 | 22.69 |
| 6 | do | 56 | N,N-dimethylformamide (3). | 4.5 | 55–65 | 10.9 | 10.99 | 19.35 | 22.69 |
| 7 | do | 56 | *Armid O (3) | 4.5 1 | 55–65 70 | 10.9 | 10.99 | 21.29 | 22.69 |
| 8 | do | 56 | Ethylene thiourea (3). | 2.5 | 60–65 | 10.7 | 10.99 | 21.91 | 22.69 |
| 9 | do | 56 | Benzamide (3) | 3 | 60–65 | 10.1 | 10.99 | 18.61 | 22.69 |
| 10 | do | 56 | Thiourea (3) | 3 | 60–65 | 10.9 | 10.99 | 21.64 | 22.69 |
| 11 | do | 56 | Caprolactam (1.4) | 4 | 55–65 | 10.8 | 10.99 | 22.95 | 22.69 |
| 12 | do | 56 | Caprolactam (0.7) | 5 | 05–65 | 11.0 | 10.99 | 22.88 | 22.69 |

*A commercially available acid comprising a mixture of oleamide and linoleamide.

EXAMPLE 13

To a reaction vessel fitted with stirrer, thermometer, and reflux condenser, there is added 520 parts of isoctyl alcohol. To the isooctyl alcohol there is incrementally added over a period of four hours 222 parts of $P_2S_5$ during which time the temperature rises from 25°–55° C. The reaction mixture is then maintained at 55°–60° C. for approximately 1.75 hours and filtered at 50° C. The isooctyl phosphorodithioic acid thus produced is lighter in color than isooctyl phosphorodithioic acids produced in the absence of the nitrogen-containing catalyst and at a temperature 10° higher than that employed in the presence of the catalyst. The product is characterized by a phosphorus content of 8.24% (theory: 8.75) and a phosphorus content of 16.98% (theory: 18%).

of 10.4% by weight (theory: 10.4) and a sulfur content of 21.54 (theory: 21.4).

EXAMPLE 17

(A) A phosphorodithioic acid is prepared from a mixture of 65 parts isobutanol and 35 parts primary amyl alcohol in the following manner. 348 parts of said alcohol mixture, 222 parts of $P_2S_5$ and 2.7 parts caparolactam are heated from 23° C. to 50° C. over a two and one-half hour period; for one hour at 55°–65° C.; for a half-hour at 65° C. to 70° C., cooled over a one-hour period to 40° C., and filtered. The filtrate is the desired phosphorodithioic acid and is characterized by a phosphorus content of 11.77% (theory: 12.30) and a sulfur content of 23.05% (theory: 25.38). It is lighter in color than comparable phosphorodithioic acids prepared in the absence of the lactam.

(B) 348 parts of the alcohol mixture of (A) above, 222 parts of $P_2S_5$ and 10.7 parts of caprolactam are heated to a temperature of about 24° C. to 48° C. for approximately 1.8 hour and then at 48° C. to 57° C. for about 0.3 hour; at 55°–65° C. for one hour; at 65°–70° C. for one-half hour, and thereafter filtered. The filtrate is the desired phosphorodithioic acid. It is even lighter in color than that prepared in part (A) above. It is characterized by a phosphorus content of 11.68% (theory: 12.3%) and a sulfur content of 22.67% (theory: 25.38). The use of caprolactam permits the reaction to be carried out at a temperature of 15° to 20° less than that normally employed in preparing the similar phosphorodithioic acids in the absence of the catalyst. This advantage is in addition to the lighter color of the product thus obtained.

The foregoing examples are merely illustrative of the improved process of this invention. Obviously, those skilled in the art will be able to apply the improved process described herein to the preparation of other phosphorodithioic acids using the nitrogen-containing catalyst in the amounts described hereinabove.

As explained hereinbefore, phosphorodithioic acids are well known intermediates for preparing many useful compounds. For example, they can be reacted with various basically reacting metal compounds to produce neutral and basic metal salts which are useful as additives in lubricants and fuels. Generally, the metal will be a Group II metal but other metals are also useful. Specific examples of suitable metal salts are the nickel, aluminum, cadmium, tin, lead, zinc, magnesium, calcium, strontium, barium, and copper salts. Such salts are particularly useful when added to lubricating oil compositions where they function as oxidation and corrosion inhibitors and antiwear agents. However, uses of the phosphorodithioic acids produced by the improved process of this invention are well known to those skilled in the art and need no further discussion herein. The above incorporated U.S. Patents set forth in particular detail how these acids may be used.

When reference is made herein to equivalents of hydroxy compound, it is to be understood that a hydroxy compound has a number of equivalents per mole equal to the number of hydroxy groups present in the hydroxy compound. Thus, phenol has one equivalent per mole and diethylene glycol or p-hydroxyethylphenol have two equivalents per mole.

What is claimed is:

1. In the process for preparing phosphorodithioic acids of the formula

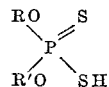

wherein R and R' are each independently selected from hydrocarbyl and substituted hydrocarbyl groups by contacting (A) at least one hydroxy compound of the formula ROH or R'OH, where R and R' are as defined above, with (B) phosphorus pentasulfide, the improvement therein comprising reacting (A) and (B) in the presence of a catalytically effective amount of at least one nitrogen-containing compound selected from the class consisting of

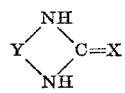

wherein X is oxygen or divalent sulfur and Y is an alkylene radical of two to seven carbon atoms which, with the

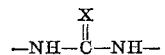

group forms a 5-, 6-, or 7-membered ring, and

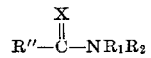

wherein X is oxygen or divalent sulfur, R'' is H, $NH_2$—alkyl of up to twenty carbon atoms, hydrocarbon aryl groups of up to twenty carbon atoms, and each of $R_1$ and $R_2$ are independently H, lower alkyl, or lower alkenyl with the proviso that one of $R_1$ and $R_2$ together with R'' and

the group can form a 5-, 6-, or 7-membered lactam.

2. The improvement according to Claim 1 wherein the nitrogen-containing compound is selected from the class consisting of N-vinyl pyrrolidone, pyrrolidone, caprolactam, urea, thiourea, ethylene thiourea, acetamide, benzamide, N,N-dimethyl-formamide, oleamide, linoleamide, or mixtures of two or more of these.

3. The improvement according to Claim 1 wherein the nitrogen containing compound is present in an amount of from about 0.05% to about 10% by weight based on the total weight of $P_2S_5$ employed in the process.

4. The improvement according to Claim 3 wherein at least one of R and R' is an aryl or substituted aryl group.

5. The improvement according to Claim 1 wherein the nitrogen-containing compound is present in an amount of from about 0.1% to about 7% by weight based on the total weight of $P_2S_5$ employed in the reaction.

6. The improvement according to Claim 5 wherein at least one of R and R' is phenyl or aliphatic hydrocarbyl-substituted phenyl.

7. The improvement according to Claim 1 wherein said nitrogen-containing compound is present in an amount of from about 0.25% to about 5% by weight, based on the total weight of $P_2S_5$ employed in the process.

8. The improvement according to Claim 6 wherein said nitrogen-containing compound is a 5-, 6-, or 7-membered lactam.

9. The improvement according to Claim 8 wherein said lactam is caprolactam.

References Cited
UNITED STATES PATENTS

| | | | |
|---|---|---|---|
| 3,361,668 | 1/1968 | Wiese | 260—981 X |
| 3,403,201 | 9/1968 | Adrian et al. | 260—981 |

LORRAINE A. WEINBERGER, Primary Examiner

R. L. RAYMOND, Assistant Examiner

UNITED STATES PATENT OFFICE
CERTIFICATE OF CORRECTION

Patent No. 3,848,032  Dated November 12, 1974

Inventor(s) William Monroe LeSuer and Horton Dunn, Jr.

It is certified that error appears in the above-identified patent and that said Letters Patent are hereby corrected as shown below:

At column 1, line 40, "$\overset{X}{\underset{}{\underset{-C-N}{\parallel}}}\diagup$" should be -- $\overset{X}{\underset{}{\underset{-C-N}{\parallel}}}\diagup$ --.

At column 2, line 7 "more" should be -- mole --.

At column 2, line 18, "phosphorolithioic" should be -- phosphorodithioic --.

At column 2, line 54, "phenylethylpehnol" should be -- phenylethylphenol --.

At column 1, line 56, "benzylnapthol" should be -- benzylnaphthol --.

At column 2, line 60, "2,4-diamylphenoxypehnol" should be -- 2,4-diamylphenoxyphenol --.

At column 3, line 47, "the" second occurence should be -- this --.

At column 3, line 61, "phosphorodithoic" should be -- phosphorodithioic --.

At column 4, line 51, "61," should be -- 6-, --.

At column 4, line 57, "parts in" should be -- parts used in --.

UNITED STATES PATENT OFFICE
CERTIFICATE OF CORRECTION

Patent No. 3,848,032  Dated November 12, 1974

Inventor(s) William Monroe LeSuer and Horton Dunn, Jr.

It is certified that error appears in the above-identified patent and that said Letters Patent are hereby corrected as shown below:

At column 4, line 67, "During" should be -- during --.

At column 5, line 33, "bzy" should be -- by --.

At column 5, line 37, "act" should be -- set --.

At column 5 and 6, Example 12, "05-65" should be -- 55-65 --, in Reaction Temp. °C. Column of Table.

At column 5, line 63, "isoctyl" should be -- isooctyl --, first occurrence.

At column 6, line 14, "theory: 4.98)" should be -- (theory: 4.98) --.

At column 6, line 21, "to" should be -- in --.

At column 6, line 66, "caparolactam" should be -- caprolactam --.

At column 8, lines 20-24, that is Claim 1, line 21, "and $\overset{O}{\underset{}{\underset{-C-N}{\|}}}$ the group" should be -- and the $\overset{O}{\underset{-C-N}{\|}}$ group --.

UNITED STATES PATENT OFFICE    Page 3
CERTIFICATE OF CORRECTION

Patent No. 3,848,032     Dated November 12, 1974

Inventor(s) William Monroe LeSuer and Horton Dunn, Jr.

It is certified that error appears in the above-identified patent and that said Letters Patent are hereby corrected as shown below:

At column 5, line 1, "10.99" should be -- 10.99% --.

At column 5, line 2, "22.69" should be -- 22.69% --.

At column 5, line 10, "10.99" should be -- 10.99% --.

At column 5, line 12, "22.69" should be -- 22.69% --.

At column 5, line 27, "20.90" should be -- 20.90% --.

At column 5, line 74, "8.75" should be -- 8.75% --.

At column 6, line 15, "4.98" should be -- 4.98% --.

At column 6, line 15, "10.29" should be -- 10.29% --.

At column 6, line 29, "4.98" should be -- 4.98% --.

At column 6, line 30, "10.29" should be -- 10.29% --.

At column 6, line 60, "10.4" second occurence, should be -- 10.4% --.

At column 6, line 61, "21.54" should be -- 21.54% --.

At column 6, line 61, "21.4" should be -- 21.4% --.

UNITED STATES PATENT OFFICE
CERTIFICATE OF CORRECTION

Patent No. 3,848,032          Dated November 12, 1974

Inventor(s) William Monroe LeSuer and Horton Dunn, Jr.

It is certified that error appears in the above-identified patent and that said Letters Patent are hereby corrected as shown below:

At column 6, line 72, "12.30" should be -- 12.30% --.

At column 6, line 73, "25.38" should be -- 25.38% --.

At column 7, line 12, "15° to 20°" should be -- 15°C. to 20°C. --.

Signed and sealed this 18th day of March 1975.

(SEAL)
Attest:

RUTH C. MASON
Attesting Officer

C. MARSHALL DANN
Commissioner of Patents
and Trademarks